United States Patent
Särndahl

(10) Patent No.: US 9,758,356 B2
(45) Date of Patent: Sep. 12, 2017

(54) SWIVEL

(71) Applicant: BINAR QUICK-LIFT SYSTEMS AB, Trollhattan (SE)

(72) Inventor: Albin Särndahl, Trollhättan (SE)

(73) Assignee: BINAR QUICK-LIFT SYSTEMS AB, Trollhattan (SE)

( * ) Notice: Subject to any disclaimer, the term of this patent is extended or adjusted under 35 U.S.C. 154(b) by 0 days.

(21) Appl. No.: 15/026,796

(22) PCT Filed: Oct. 3, 2014

(86) PCT No.: PCT/SE2014/051150
§ 371 (c)(1),
(2) Date: Apr. 1, 2016

(87) PCT Pub. No.: WO2015/050498
PCT Pub. Date: Apr. 9, 2015

(65) Prior Publication Data
US 2016/0244303 A1    Aug. 25, 2016

(30) Foreign Application Priority Data

Oct. 4, 2013    (SE) ..................... 1351174

(51) Int. Cl.
*B66C 13/14*    (2006.01)
*F16L 27/08*    (2006.01)
(Continued)

(52) U.S. Cl.
CPC .......... *B66C 13/14* (2013.01); *F16L 27/0828* (2013.01); *F16L 27/093* (2013.01); *E02F 9/00* (2013.01)

(58) Field of Classification Search
CPC ........ H01R 31/06; H01R 35/04; H01R 39/64; H01R 13/6315; B66C 13/14
(Continued)

(56) References Cited

U.S. PATENT DOCUMENTS 2,176,323 A * 10/1939 Bowen .................... E21B 21/02
 175/214
2,376,370 A * 5/1945 Lombardi ............. H01R 39/64
 174/21 JR
(Continued)

FOREIGN PATENT DOCUMENTS

DE    102011051733    2/2012
JP    3127602    3/1994
(Continued)

OTHER PUBLICATIONS

Written Opinion issued in PCT/SE2014/051150, Dec. 1, 2015, pp. 1-5.
(Continued)

*Primary Examiner* — Amy Cohen Johnson
*Assistant Examiner* — Oscar C Jimenez
(74) *Attorney, Agent, or Firm* — Jeffrey S. Melcher; Manelli Selter PLLC

(57) ABSTRACT

The present invention relates to a swivel comprising a static portion (1, 2, 124, 126) and a rotating portion (3, 120), which portions are coaxially rotatable about a longitudinal axis, wherein the static portion (1, 24, 124, 126) and the rotating portion (3, 120) electrically contact each other for transmission of electricity and/or signals/data between said portions, and which comprises an hole (30), which is centrally arranged and which runs coaxially along said longitudinal axis, for passage of a fluid, wherein the static portion comprises a housing (1) and a bottom (2), and the rotating portion comprises an axis part (3), which comprises an integrated bottom part (36) supported by said bottom (2), and that said axis part (3) comprises an integrated bottom part (36) which is supported by said bottom (2), and that said axis part (3) comprises a tubular upper part (32) extending upwards from said integrated bottom part (36), with said (Continued)

centrally arranged hole (30) for passage of a fluid is arranged.

18 Claims, 3 Drawing Sheets

(51) Int. Cl.
    *F16L 27/093*     (2006.01)
    *E02F 9/00*     (2006.01)

(58) Field of Classification Search
    USPC ..... 439/6, 8, 10, 11, 13, 178–179, 190, 195, 439/207
    See application file for complete search history.

(56) References Cited

U.S. PATENT DOCUMENTS

| | | | | |
|---|---|---|---|---|
| 2,395,899 | A | * | 3/1946 | Morrow ................. F41A 27/18 174/21 JR |
| 2,396,123 | A | * | 3/1946 | Phillips ............... F16L 27/0828 174/8 |
| 3,234,317 | A | * | 2/1966 | Henderson ............... B23K 7/10 174/15.7 |
| 4,142,767 | A | * | 3/1979 | Karl ....................... H01R 39/00 439/24 |
| 4,177,869 | A | * | 12/1979 | Crabiel ................. F16L 27/087 180/6.58 |
| 4,500,119 | A | * | 2/1985 | Geberth, Jr. ........ F16L 27/0828 285/276 |
| 5,030,015 | A | | 7/1991 | Baker |
| 5,908,060 | A | | 6/1999 | Fargot |
| 7,311,489 | B2 | | 12/2007 | Ekman |
| 7,559,533 | B2 | | 7/2009 | Stockmaster |
| 8,985,484 | B2 | * | 3/2015 | Eley .......................... B05B 9/01 239/390 |
| 2008/0188093 | A1 | * | 8/2008 | Jaeger ................... H01R 35/04 439/13 |
| 2014/0060853 | A1 | * | 3/2014 | Henderson .............. E21B 34/10 166/374 |
| 2016/0013603 | A1 | * | 1/2016 | Hui .................... H01R 13/5205 439/13 |

FOREIGN PATENT DOCUMENTS

| | | |
|---|---|---|
| SE | 9700623 | 8/1998 |
| SE | 516691 | 2/2002 |
| SE | 520462 | 7/2003 |
| SE | 1100099 | 5/2012 |
| WO | 2012067559 | 5/2012 |

OTHER PUBLICATIONS

International Search Report issued in PCT/SE2014/051150, Dec. 1, 2015, pp. 1-3.

* cited by examiner

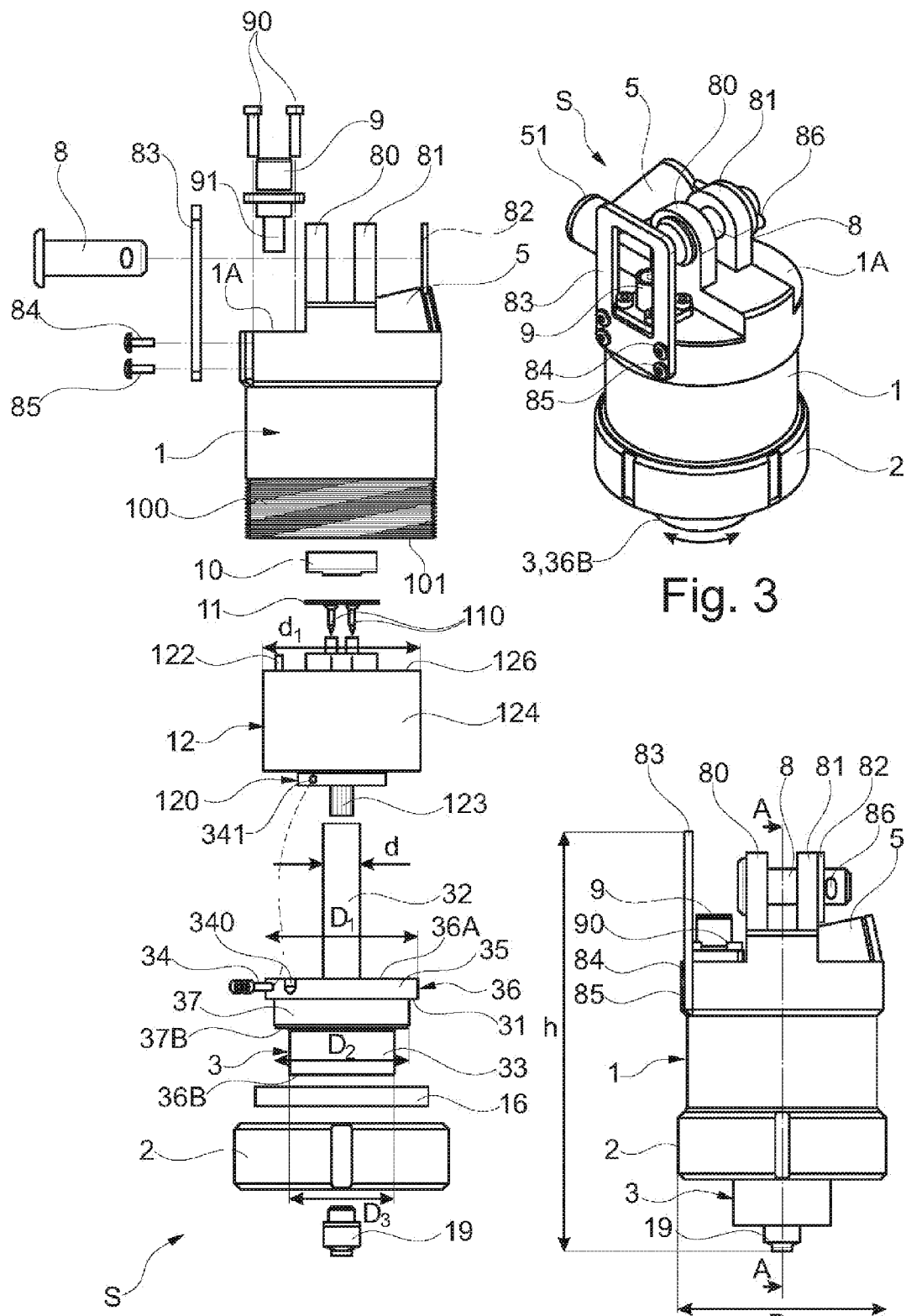

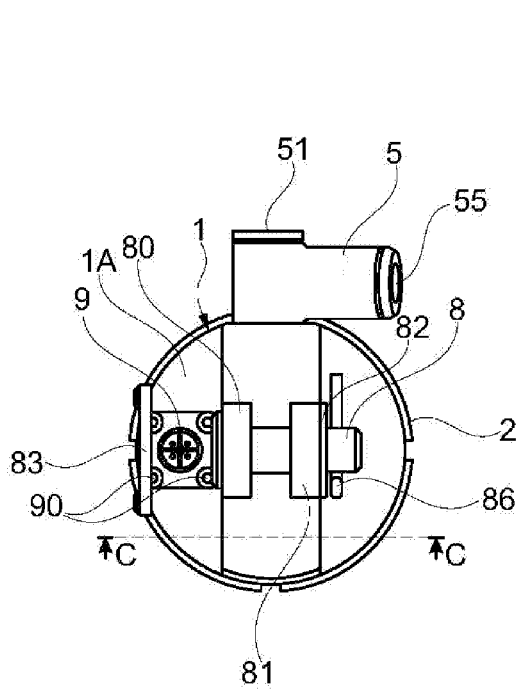
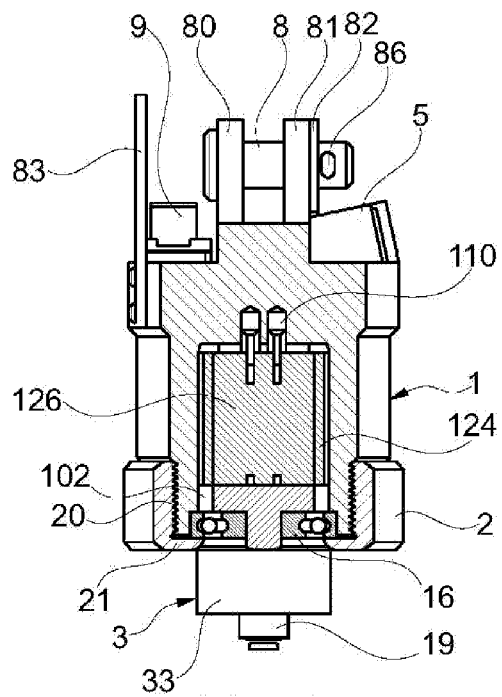
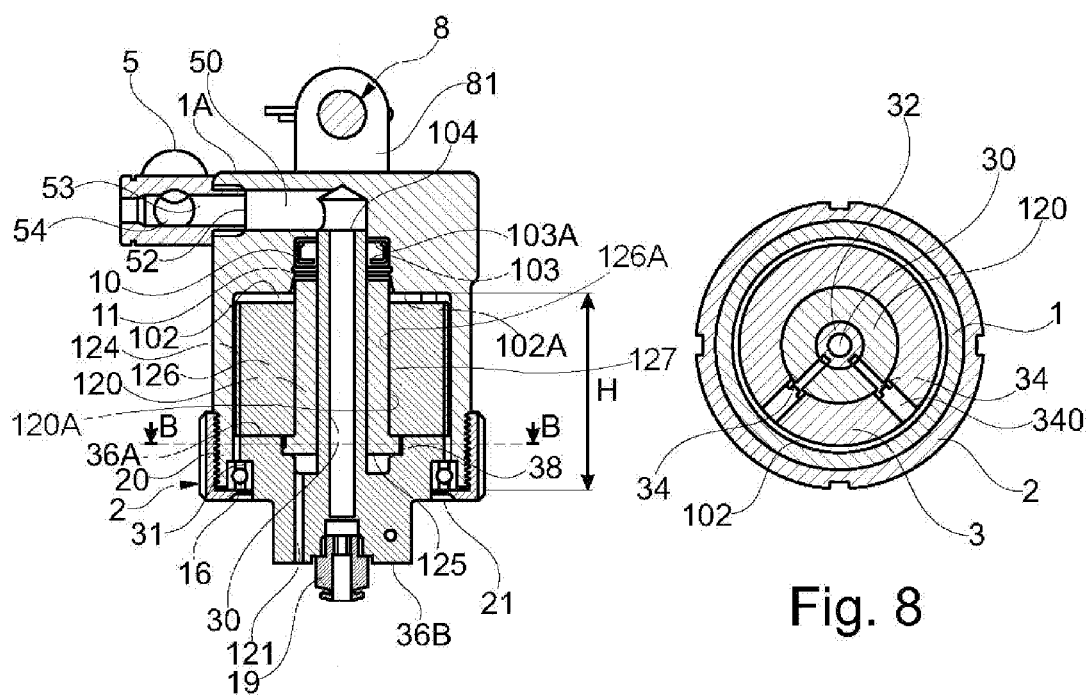

SWIVEL

TECHNICAL FIELD

The present invention relates to a swivel comprising a static portion and a rotating portion, which portions are coaxially rotatable about a longitudinal axis, wherein the static portion and the rotating portion electrically contact each other for the transmission of electricity and/or signals/data between said parts, and which comprises a central opening along said longitudinal axis for a fluid to pass.

PRIOR ART

A swivel is a component, which is used to transport different types of fluids from a stationary inlet to a rotating outlet. Swivels are used in a plurality of different environments and different circumstances. For instance, they are very useful within the industry, where many lifts are made by means of different kinds of operation means and a swivel is then used to avoid muddles of wires and cables, which can result in unnecessary wear and damages. Many times, an electric cable runs directly down to the operation means and if the operator goes from one working station to another working station always in the same direction, it is unavoidable that sooner or later wire muddles occur, often resulting in damages on cables. Traditionally, swivels are clumsy components consisting of many parts, which i.a. result in they being complicated and expensive to manufacture.

Through U.S. Pat. No. 7,559,533 a lifting device is previously known, comprising a belt pulley, which is driven by an operating means. A cable is attached in and runs around the belt pulley with the other end free for the attachment of a load. At the free end an operating means is arranged, e.g. a handle, hanging means as well as a hook, suction cups or the like for the attachment of a load. The operating means comprises slip rings for the transmission of electric signals from the operating means to the operating device, wherein the slip rings have such a design that a continuous rotation of 360° is possible independent of wire and helical cables. The slip rings are also adapted to allow air (pneumatic and/or vacuum) or any other pressurized fluid to pass through its centre and still allow a free rotation.

A lifting device is previously known through U.S. Pat. No. 6,030,015, comprising a belt having a hook which is removably attached in its free end. The hook body is via bearings rotatably mounted in the basic part of the hook. The bearing and a holder ring are arranged in the lower part inside the basic part of the hook and rest on an inner flange.

Swivels are previously known through SE 1 100 099, SE 520 462, and SE 516 691, which swivels are arranged on a working arm of a working machine.

DISCLOSURE OF THE INVENTION

The object of the present invention is to eliminate or at least to minimize the problems mentioned above, which is achieved with a swivel according to claim 1.

Thanks to the invention a mechanic, electric, and pneumatic swivel is provided, which swivel is extra compact and contains few parts thanks to its construction.

According to an aspect of the invention, the swivel comprises a static portion and a rotating portion, wherein the static portion comprises a housing as well as a bottom, and the rotating portion comprises an axis part, which axis part comprises an integrated bottom part, which implies that the swivel consists of few parts, which makes it compact and simple/cheap to manufacture.

According to another aspect of the invention, the swivel is extra compact when the static portion is load carrying and the axis part is supported by said bottom.

According to still an aspect of the invention, said axis part comprises an essentially tubular upper part as well as an integrated bottom part, through which a central opening is arranged to enable passage of a fluid.

According to an additional aspect of the invention, the integrated bottom part consists of tree sections, wherein the three sections have a decreasing diameter from the top downwards, which offers the advantage that the integrated bottom part may be fitted into the static portion and hence be an integrated part of the axis part.

According to still an aspect of the invention, the first section has a lower surface and the axis part via this surface rests on a bearing, which is supported by a flange, included in said bottom, which makes the static portion load carrying.

According to another aspect of the invention, the swivel comprises an electric swivel, which offers the advantage that power/data may be transmitted between the static and the rotating portions.

According to an additional aspect, the electric swivel comprises an outer part an an inner part, where the outer part belongs to the static portion, and the inner part belongs to the rotating portion, and the electric transmission between the outer part and the inner part of the electric swivel takes place via sliding contacts and slip rings, which offers the advantage that no electric cable has to be drawn on the outside of the swivel to get the force transmission down to the operation means.

According to another aspect of the invention, the housing comprises outer threads, and the bottom comprises inner threads, wherein the outer threads and the inner threads are arranged to interact with each other for a simple and durable interconnection between the housing and the bottom.

According to still an aspect of the invention, the swivel comprises a quick-coupling at its lower end, which makes it possible, easily and quickly to exchange the operation means.

BRIEF DESCRIPTION OF DRAWING

The invention will below be described more in detail with reference to the enclosed drawings, of which:

FIG. 2 shows an exploded view of a swivel according to the invention;

FIG. 3 shows perspective view of a swivel according to the invention;

FIG. 4 shows side view of a swivel according to the invention;

FIG. 5 shows a swivel according to the invention, seen from above;

FIG. 6 shows a cut along the line C-C in FIG. 5;

FIG. 7 shows a cut along the line A-A in FIG. 4; and

FIG. 8 shows a cut along the line B-B in FIG. 7.

DETAILED DESCRIPTION OF DRAWINGS

Figure 1:
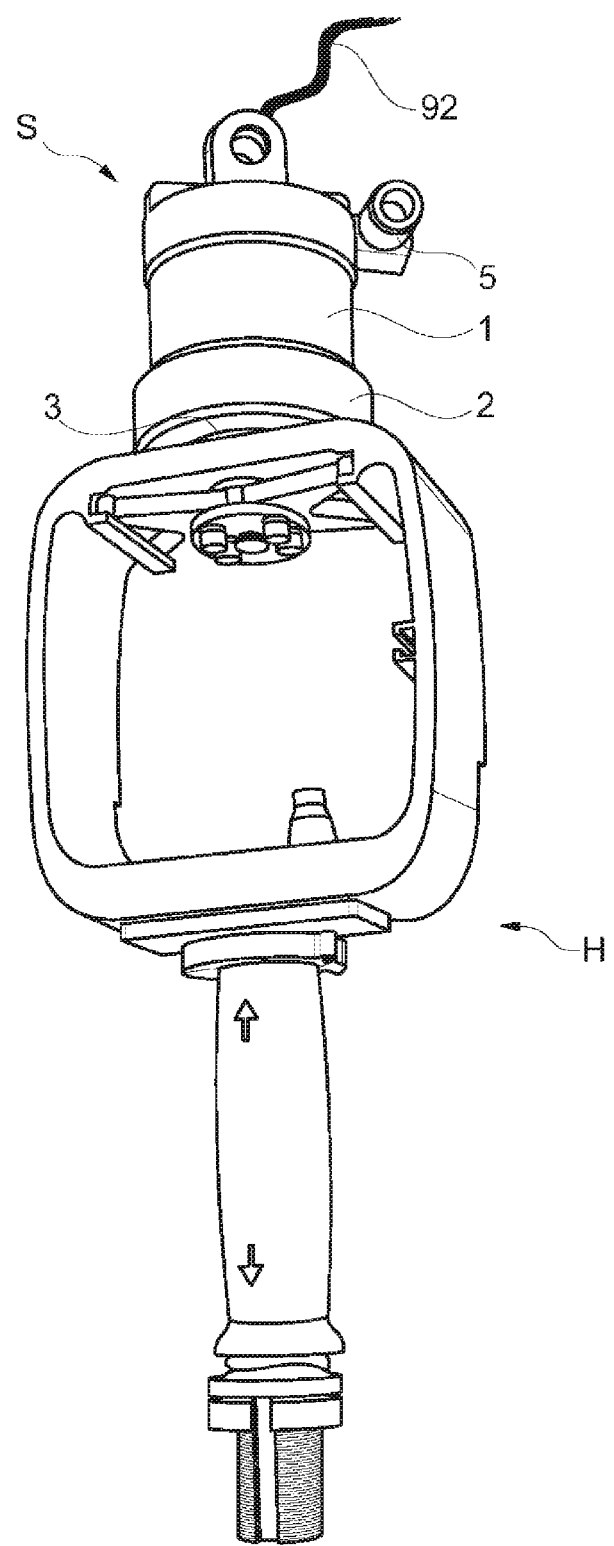
FIG. 1 shows a swivel according to the invention connected to an operation means.

FIG. 1 shows a swivel S according to the invention, connected in its lower end to an operation means H to a lifting device. The swivel S comprises a static portion 1, 2 and a rotating portion 3, 120, which is not shown in FIG. 1, as the rotating portion 3, 120 is essentially surrounded by the static portion 1, 2. The operation means H is with its upper part fixed to a lower end of the rotatable portion of the swivel. Further, an inlet part 5 for e.g. pressurized air is shown, and a cabling 92 is outlined.

With the aim to explain how the construction details characteristic for the invention are designed and interact with each other to achieve the object of the invention, these parts are shown in an exploded view in FIG. 2. It will be described in detail below how the different parts are designed and interact with each other. At the description of the pertinent parts, reference is made to upper and lower, alternatively outer and inner, wherein upper relates to details and sides of details facing upwards towards the part in which the swivel S is suspended and lower relates to the opposite end. Outer means details and sides of details facing radially outwards towards the outside of the swivel S and inner relates to details and sides of details facing radially inwards towards the inner of the swivel.

FIG. 2 shows an exploded view of a swivel S according to the invention in a preferred embodiment. With reference to FIG. 2, the pertinent parts will be described from top to bottom and later in the description they will be described more in detail. The swivel S comprises a housing 1, which on its upper side 1A comprises a suspension device 8, 80, 81 for the suspension of the swivel S, in a wire, for instance, (not shown). An inlet 5, e.g. for pressurized air, a connector 9 (for a cabling) as well as a fender washer 83 are also arranged on the top 1A of the housing. Further, the housing 1 comprises an inner, essentially cylindrical cavity 102 (see FIGS. 6 and 7) with an opening 101 at the bottom of the housing 1. The cylindrical cavity 102 is intended to receive a sealing 10, a washer 11, means 110, an electric swivel 12, an axis part 3 as well as a bearing 16. At the lower part of the housing 1, a bottom 2 and a quick coupling 19 are arranged.

The housing 1 comprises an essentially cylindrical body, which body at its lower end comprises outside threads 100. Further the housing 1 comprises an inner, essentially cylindrical cavity 102 with an opening 101 at the bottom of the housing 1. The cylindrical cavity 102 is arranged to receive an axis part 3 and an electric swivel 12. The cavity 102 has a height H (see FIG. 7) corresponding to about ¾ of the total height of the housing 1. In the upper flat surface 102A of the cavity 102, a small, essentially cylindrical cavity 102 is coaxially arranged above the larger cavity 102. The small cavity 103 has in its upper surface 103A an opening 104 to a radial bore hole 50, ending in an inlet 5 arranged on the outside of the housing 1.

FIG. 3 shows the swivel S in a perspective view, where the housing 1 and said bottom 2 are attached to each other. The bottom 2 comprises an essentially cylindrical, annular part with internal threads 20, which threads 20 are arranged to interact with the outside threads 100 of the housing 1 for connecting the same. FIG. 3 also shows how a lower part 36B of the axis part 3 in the rotatable portion projects below the bottom 2. Further, it is seen how a fender washer 83 is arranged, attached by screws 84, 85 on the outside of the upper part of the housing so that the fender washer 83 extends in the longitudinal direction of the swivel S. The fender washer 83 is preferably arranged on the outside of the housing 1 in connection to the place where the connector 9 is arranged, in this manner to protect the cables to be coupled into the connector 9. The fender washer 83 preferably comprises a rectangular plate with holes in its lower edge so it by means of the screws 84, 85 may be attached to the outside of the housing 1 and extend upwards above the upper side 1A of the housing.

Centrally on the upper side 1A of the housing a suspension device is arranged, comprising two parallel walls 80, 81 with a gap therebetween, which walls extend in the longitudinal direction of the swivel S. The walls 80, 81 extend parallally to each other by about ⅓ of the diameter 1A of the upper side and are preferably integrated parts of the housing 1. Each one of the walls 80, 81 comprises a circular hole for the receipt of a rig rivet 8, which rig rivet 8 is inserted from an outer side of one of the walls 80, 81 through the holes, and at the outside of the opposite wall 80, 81 the rig rivet 8 is attached with a washer 82 and a split pin 86. By means of the suspension device the swivel S can be suspended in a wire or the like. FIG. 4 shows the suspension device in a side view.

The bottom 2 may be compared to a large nut with an annular flange 21 at its lower end, see FIGS. 6 and 7, which flange 21 extends inwards towards the centre of the bottom 2. The annular flange 21 is intended to be a rest site for a bearing 16, which will be described more in detail below.

FIGS. 5, 6 and 7 show the swivel S from above and in two different cross-sections, wherein it can be noticed how said suspension device is arranged centrally on the upper side 1A of the housing. Further, it is shown how the radial bore hole 50 inside the housing 1 ends in an inlet 52 to the inlet part 5, which is attached at the top (e.g. via threads) at the side of the housing 1, but which may be in the form of an integrated part of the housing 1. From the inlet 52, a first channel 53 extends, which is coaxial to the radial bore hole 50. The bottom of this channel 53 is closed and constitutes a tool engagement 51 for the threading of the inlet part 5. A second channel 54 runs from the first channel 53 to an inlet end 55, and the second channel 54 turns about 90° from the direction of the bore hole 50. For instance, pressurized air can be connected to the inlet part 5.

At the upper side 1A of the housing a connector 9 is arranged between one wall 80 of the suspension device and the fender washer 83, which connector is preferably attached by screws 90. The connector 9 has a lower connection part 91 (see FIG. 2), which is arranged in a bore hole (not shown) in the housing 1 to contact an upper cabling 122 on the electric swivel 12, when it is arranged inside the housing 1.

The rotatable portion comprises an axis part 3, see FIG. 2. The axis part 3 comprises an essentially cylindrical, tubular upper part 32 with a diameter d in the range of 3 to 50 mm, more preferred in the range of 5 to 20 mm, and in the described example the tubular upper part 32 has a diameter d of 12 mm. The tubular upper part 32 is in its lower end integrated with a bottom part 36. Said bottom part 36 is essentially cylindrical and consists of three sections, wherein the first upper part 35 has a first diameter D1, which first diameter D1 is adapted to the cylindrical cavity 102 of the housing 1, so that the first part 35 may be inserted into the cylindrical cavity 102. The first diameter D1 is in the range of 10 to 100 mm, more preferred in the range of 30 to 70 mm, and in the described example the diameter D1 is 51.2 mm. Further, the bottom part 36 comprises a second part 37 with a second diameter D2, which preferably is smaller than the first diameter D1. The second diameter D2 is suitably adapted to the diameter of the annular flange 21 of the bottom 2, so that the second part 37 is accommodated inside the flange 21 in the assembled state. The second diameter D2 is in the range of 10 to 100 mm, more preferred in the range of 30 to 60 mm, and in the described example the diameter D2 is 45 mm. The bottom part 36 also comprises a third lower part 33, the diameter D3 of which preferably is smaller than the second diameter D2. The third diameter D3 is in the range of 5 to 80 mm, more preferred in the range of 20 to 60 mm, and in the described example the diameter D3 is 34.5 mm. A central hole 30 (see FIG. 7) extends through the entire upper part 32 and the bottom part 36, which hole runs in the longitudinal direction of the swivel S through the axis part 3. At the upper side 36A of the bottom part 36, a circular indentation 38 is arranged about the tubular upper part 32 (see FIG. 7), which indentation is intended to accommodate a lower part 125 of an inner part 120 of the electric swivel, which is further described below. Further, a cable channel 121 is arranged in the bottom part 36 of the axis part, which is also shown in FIG. 7, and which channel extends in the longitudinal direction of the swivel S from the bottom of said indentation 38 and down through the entire bottom part 36. At the upper side 36A of the bottom part two bore holes 340 are arranged (see FIG. 8) at a mutual distance of about 90°. The bore holes 340 are intended for two locking screws 34, which by means of threaded screw holes 341 through the inner part 120 of the electric swivel enables locking of the two parts 3, 120 to each other.

FIGS. 6 and 7 show how the first upper part 35 of the bottom part is accommodated inside the cavity 102 of the housing and that it comprises a lower outer surface 31 resting on the ball bearing 16. The second part 37 of the bottom part is with a narrow fit accommodated inside said bearing 16 and the annular flange 21 of the bottom. The second section 37 of the bottom part comprises a lower surface 37B, which in an assembled state is in the same plane as the bottom side 2B of the bottom. The third lower section 33 of the bottom part extends below the bottom 2 of the housing.

FIG. 7, which is a cut along the line A-A of FIG. 4, shows how the central hole 30, which runs through the axis part 3, in its lower part has a somewhat larger diameter than the remaining part of the hole 30. The hole 30 is in its lower part with form fit adapted to a quick coupling 19 for the connection to an air hose, for instance (not shown).

The electric swivel, which is to be accommodated in the cylindrical cavity 102 of the housing 1, comprises an outer, comparatively thin, cylindrical tubular insulation part 124 and an inner, cylindrical, thicker conducting part 126, which parts are fixed in relation to each other. Further, there is an inner swivel part 120 which can rotate in relation to the outer parts 124, 126. The outer insulation part 124 has an outer diameter d1, and in the example here described the outer diameter d1 is 54 mm, which is adapted to the diameter of the cavity 102 in the housing 1, so that the electric swivel 12 can freely be inserted into the cavity 102. At the upper side of the conducting part 126, an upper cabling coupling 122 is arranged, so that it, when the swivel S has been assembled, contacts the connector 9 on the upper side 1A of the housing. The inner part 120 of the electric swivel is arranged to exactly be accommodated in the outer parts 124, 126 and to allow rotation therebetween. At its lower end, the inner part 120 comprises an outwardly facing flange 125, arranged to fit in the indentation 38 of the bottom part.

At the assembly the outer parts 124, 126 of the electric swivel is rotation locked to the housing 1 by means 110, see FIG. 6, which is a cut according to the line C-C of FIG. 5. The inner part 120 of the electric swivel is arranged inside the outer parts 124, 126 with the outwardly facing flange 125 abutting against the bottom side of the outer part 124 of the electric swivel. The inner part 120 of the electric swivel extends through the outer part 124 and up into the small cavity 103, where the upper edge of the inner part 120 via a washer 11 abuts against a sealing 10. The axis 32 is in its turn arranged inside the inner part 120 of the electric swivel in such a manner that the upper end ends into an opening 104 to the radial bore hole 50, wherein thus a channel is formed from the inlet part 5 and down through the central hole 30 to the quick coupling 19. The flange 125 of the inner part abuts against the bottom of the indentation 38, so that the upper surface of the flange 125 forms a plane with the surface 36A of the bottom part and can abut against the bottom side of the outer part 124.

The rotatable portion, the axis part 3 and the inner swivel part 120, which are attached to each other by the locking screws 34, hang on a bearing 16, preferably a ball bearing, which with its lower half rests against the flange 21 of the bottom. The first upper section 35 of the bottom part comprises a lower outer surface 31, which abut against an upper half of said ball bearing 16. In such a manner, the rotatable portion, thus the axis part 3, and the inner swivel part 120 can rotate in relation to the stationary portion, the housing 1, the bottom 2 and the outer parts 124, 126 of the electric swivel.

In the assembled condition, the swivel S has a height h in the range of 30 to 300 mm, more preferred 80 to 180 mm, and in the described example the swivel has a height h of 128 mm. The swivel S has an outer diameter $D_Y$ in the region of 20 to 200 mm, more preferred in the region of 40 to 100 mm, and in the described example the swivel S has an outer diameter of 72 mm.

At the use of a swivel S according to the invention, the swivel is suspended in its suspension device 8, 80, 81, in e.g. a wire. A fluid source, e.g. pressurized air, is connected to the inlet part 5 for the flow therethrough and further through the radial bore hole 50 into the central hole 30, there to continue downwards through the swivel S up to the quick coupling 19, and further to the operation means H. Further, e.g. a 8-polar electric cable is coupled into the connector 9 at the upper side 1A of the housing, and the electricity continues through the lower connector part 91 for a further contact with the upper cabling coupling 122 on the conducting part 126 of the electric swivel and into the conducting part 126. The conducting part 126 comprises, on its inner surface 126A, brushes (not shown), and the inner part 120 of the electric swivel comprises, on its outer surface 120A, rings/strips of conducting material (not shown), and insulating plates are arranged between the rings/strips to separate them from each other. The electric transmission between the conducting part 126 and the inner part 120 of the electric swivel takes place via the brushes on the conducting part 126, which drag against the rings/strips on the inner part 120, and in such a way the electric transmission takes place in the electric swivel 12 between the outer stationary parts 124, 126 and the rotating inner part 120. The electric transmission between the static and rotating portions of the swivel S thus takes place in a region 127 between the conducting part 126 and the inner part 120. Electric transmission between a rotating portion and a static portion by means of slip rings is known to the man skilled in the art and is therefore here not described more in detail. Further, the electric transmission takes place from the inner part 120 of the electric swivel to a lower cabling coupling 123, which is arranged in the cable channel 121, where an electric cable from the operation means H is connected. In this manner, both a pneumatic and electric transmission is performed through the swivel S, which implies that no cables/wires, etc. run the risk to be damaged, and the operation means can without any limitation be turned in all possible direction without any muddle. In addition, the swivel according to the invention is extra compact, as the housing 1 is load carrying and the swivel contains comparatively few parts, i.a. when the axis part 3 is constructed with an integrated bottom 36.

The invention is not limited to the above description but can be varied within the scope of the following claims. For instance, it is realized that the suspension device can be designed in other ways than the one described here and that other attachment means than screws can be used without taking away the function of the invention. Instead of brushes it could be stationary conductors, which drag against the rings/strips for electric transmission.

The invention claimed is:

1. A swivel comprising:
   a load carrying static portion comprising an outer housing and a bottom that form separate parts; and
   a rotating portion comprising an axis part, which comprises an integrated bottom part supported by the bottom, the static and rotating portions are coaxiallay rotatable about a longitudinal axis, wherein the static portion and the rotating portion electrically contact each other for transmission of electricity and/or signals/data between said static and rotating portions, and the static and rotating portions comprise a hole which is centrally arranged and which runs coaxially along said longitudinal axis for passage of a fluid, and said axis part comprises a tubular upper part extending upwards from said integrated bottom part, with said centrally arranged hole for passage of a fluid being at least partially defined by the tubular upper part, and the tubular upper part ends in an upper part of the outer housing.

2. The swivel according to claim 1, wherein said tubular upper part ends in a radial bore hole in the upper part of the housing.

3. The swivel according to claim 2, wherein said integrated bottom part comprises at least two sections, wherein a first upper section has a first diameter, which is larger than a second diameter of a second section.

4. The swivel according to claim 3, wherein said integrated bottom part comprises at least three sections.

5. The swivel according to claim 4, wherein said second diameter is larger than a third diameter of a third lower section.

6. The swivel according to claim 3, wherein at least the upper section is accommodated in said housing and that a lower section extends beyond said housing and bottom.

7. The swivel according to claim 3, wherein said first section comprises a support surface for a bearing.

8. The swivel according to claim 3, wherein said first section comprises a support surface for a bearing which is supported by a flange arranged at said bottom.

9. The swivel according to claim 1, wherein the swivel comprises an electric swivel, which in its turn comprises outer parts, and an inner part, wherein the outer parts belong to the static portion and the inner part belongs to the rotating portion.

10. The swivel according to claim 9, wherein the electric transmission between the outer parts and the inner part of the electric swivel takes place via sliding contacts and slip rings.

11. The swivel according to 1, wherein said housing comprises outer threads and said bottom comprises inner threads, wherein the outer threads and the inner threads are arranged to interact with each other for the assembly of the housing and the bottom.

12. The swivel according to claim 1, wherein the axis part in its lower end comprises a quick coupling.

13. The swivel according to claim 9, wherein the axis part is fixedly connected to said inner part.

14. The swivel according to claim 9, wherein said inner part sealingly abuts against an annular sealing arrangement.

15. The swivel according to claim 9, wherein said axis part is provided with an axial cable channel for the transmission of electricity/data between the inner part of the electric swivel and an operation means.

16. The swivel according to claim 15, wherein said operation means is part of a manually controlled lifting device.

17. The swivel according to claim 1, wherein all parts of the static portion are coaxially arranged.

18. The swivel according to claim 1, wherein the housing comprises a suspension device.

* * * * *